United States Patent
Sawchuk et al.

(10) Patent No.: US 7,678,349 B2
(45) Date of Patent: Mar. 16, 2010

(54) SYSTEM FOR LIQUEFYING LIGHT HYDROCARBON GAS WITH A PLURALITY OF LIGHT HYDROCARBON GAS LIQUEFACTION TRAINS

(75) Inventors: Jeffrey H. Sawchuk, Katy, TX (US); Richard Jones, Jr., Katy, TX (US); Patrick B. Ward, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 930 days.

(21) Appl. No.: 11/420,331

(22) Filed: May 25, 2006

(65) Prior Publication Data

US 2006/0201853 A1 Sep. 14, 2006

Related U.S. Application Data

(62) Division of application No. 10/674,246, filed on Sep. 29, 2003, now Pat. No. 7,074,322.

(60) Provisional application No. 60/414,806, filed on Sep. 30, 2002.

(51) Int. Cl.
   *B01J 8/04* (2006.01)
(52) U.S. Cl. ...................... 422/190; 422/196
(58) Field of Classification Search ................ 422/168, 422/190, 196
   See application file for complete search history.

(56) References Cited

U.S. PATENT DOCUMENTS

| | | | |
|---|---|---|---|
| 3,161,492 A | 12/1964 | Keith et al. | |
| 5,896,755 A | 4/1999 | Wong et al. | |
| 6,168,768 B1 | 1/2001 | Alexion et al. | |
| 6,176,046 B1 | 1/2001 | Quine et al. | |
| 6,220,052 B1 | 4/2001 | Tate et al. | |
| 6,389,844 B1 | 5/2002 | Klein | |
| 6,647,744 B2 | 11/2003 | Fanning et al. | |
| 2003/0154739 A1 | 8/2003 | Fanning et al. | |
| 2004/0118153 A1 | 6/2004 | Sawchuk et al. | |

FOREIGN PATENT DOCUMENTS

| | | |
|---|---|---|
| WO | 0181845 | 11/2001 |
| WO | 03064946 | 8/2003 |
| WO | 03064947 | 8/2003 |

OTHER PUBLICATIONS

C. Th. Sanders, "De technologie van vloeibaar aardgas ontwikkeling en toekomst" Koude Klim. vol. 82, No. 8 (Aug. 1989) pp. 33-37. No translation.
Collins et al., "Liquefaction Plant Design in the 1990s", Hydrocarbon Processing, Gulf Publishing Co., Houston, TX, vol. 74, No. 4, (Apr. 1995), pp. 67-76.
Kosseim et al, "New Developments in Gas Purification for LNG Plants", IGT Int'l Inst. of Refrig. 10th LNG Conf. (May 1992).
A. Avidar et al., "Large LNG Plants" Phillips Pct. Website (May 2002).
James H.R., "Modular and Barge-Mounted Process Plants", AICHE Nat'l Meeting (Mar. 1982).

*Primary Examiner*—Edward M Johnson
(74) *Attorney, Agent, or Firm*—Albert K. Shung

(57) ABSTRACT

An improved system and method for providing reduced acid gas/dewatered light hydrocarbon gas to a light hydrocarbon gas liquefaction process wherein a plurality of light hydrocarbon gas liquefaction trains are used.

4 Claims, 4 Drawing Sheets

SYSTEM FOR LIQUEFYING LIGHT HYDROCARBON GAS WITH A PLURALITY OF LIGHT HYDROCARBON GAS LIQUEFACTION TRAINS

RELATED APPLICATIONS

This is a divisional of co-pending U.S. patent application Ser. No. 10/674,246 filed Sep. 29, 2003, which prior application is entitled to and claims benefit of U.S. Provisional Application Ser. No. 60/414,806 filed Sep. 30, 2002. The teachings of the above applications are incorporated herein by reference in their entirety.

FIELD OF THE INVENTION

This invention relates to an improved system and method for liquefying variable selected quantities of light hydrocarbon gas to produce liquefied light hydrocarbon gas using a plurality of light hydrocarbon gas liquefaction trains using shared facilities.

BACKGROUND OF THE INVENTION

Many light hydrocarbon gas reserves are found in areas of the world that are remote to any markets for the light hydrocarbon gas. Such light hydrocarbon gas is referred to as natural gas. This natural gas may contain condensates that are light gasoline boiling range materials as well as $C_3$-$C_5$ gaseous hydrocarbons and methane.

Frequently such natural gas also contains undesirably high quantities of water, acid gas compounds such as sulfur compounds, carbon dioxide and the like for liquefaction to produce liquefied light hydrocarbon gases, which typically comprise primarily methane and which are frequently referred to as liquefied natural gas (LNG).

When such gases are liquefied, the capacity of the liquefaction plant is determined primarily by the available market for the gas, the availability of transportation to the market and the like. Accordingly in many instances it is desirable to increase the capacity of the liquefaction process in incremental stages as the market expands to remain in balance with the available market. Accordingly light hydrocarbon gas liquefaction processes, referred to herein as natural gas liquefaction processes or LNG processes, are typically installed in trains. The term "train" as used processes, are typically installed in trains. The term "train" as used herein refers to a series of vessels capable of, pre-treating and liquefying natural gas. The gas in desirably treated to remove acid gases and water to very low levels prior to charging it to the liquefaction zone. The train also includes compression facilities for compressing the refrigerant required for the refrigeration vessel and the like. The train is an integrated process for producing a selected quantity of liquefied natural gas. Additional trains are added as capacity is required to meet the available market demand and the like.

In FIG. 1, a light hydrocarbon gas liquefaction system and process (train) is schematically shown. The system and process, as shown, includes a refrigeration facility 12. As shown, compressed refrigerant is supplied to facility 12 by turbines 14 and 16, which are shaft coupled by shafts 18 and 20 to refrigerant compressors 22 and 24. Low-pressure refrigerant is supplied to compressors 22 and 24 by low-pressure refrigerant lines 26 and 28. These lines typically return low-pressure refrigerant from facility 12 after it has served its purpose as a refrigerant and has been warmed to a substantially gaseous condition. Compressed refrigerant is supplied via a line 30 to facility 12 and via a line 32 to facility 12. As shown, these lines enter facility 12 at different points. No significance should be attributed to this except that refrigerants can be produced from compressors 22 and 24 at different pressures if desired and passed to facility 12 different points in the refrigeration process as desired. Spent refrigerant is also shown as recovered through lines 26 and 28 to compressors 22 and 24 respectively. The same or different refrigerants can be used, refrigerants at a different pressures can be used and the like as well known to those skilled in the art.

Further an inlet light hydrocarbon gas which has desirably been treated to remove acid gases and water and is charged to facility 12 via a line 34. A liquefied light hydrocarbon gas is produced through line 36. A wide variety of refrigeration processes are contemplated within the scope of the present invention. No novelty is claimed with respect to the particular type of refrigeration process or vessel used. The process of the present invention is considered to be useful with any type of liquefaction process that requires light hydrocarbon gas as an inlet stream.

Typically a natural gas or other light hydrocarbon gas stream in introduced through a line 40 and passed to an acid gas removal vessel 44. An acid gas regenerator 44 is shown in fluid communication with vessel 46 via lines 38 and 50. The treated gas is typically recovered from vessel 44 through line 48. The recovered gases are passed via a lines 54 and 56 to one or the other of dewatering vessels 58 and 60. Typically vessel 44 is an aqueous amine scrubber and operates as well known to those skilled in the art. The aqueous amine may be selected from materials such as digycolanolamine (DEA), methyldiethanolamine (MDEA), methylethylanolamine (MEA), sulfinol (trademark of Shell Oil Co for amine for acid gas removal) and combinations thereof. The $Co_2$ is typically removed to levels less than about 100 parts per million (ppm) and sulfur is typically removed to levels less than about 16 ppm.

The operation of such acid gas removal vessels, as shown, is well known. Since each train is typically constructed separately as demand requires, it is common to provide an acid gas removal vessel and an acid gas regenerator, for each train.

Since the aqueous amine process produces a gas that is relatively saturated in water and since the water freezes at a temperature much higher than methane, which constitutes the majority of the natural gas stream to be liquefied, it is necessary that at least a major portion of the water to be removed. This is typically accomplished by passing the stream containing the water after acid gas removal through lines 54 or 56 into molecular sieve vessels 58 and 60 where the water is selectively removed to produce a dewatered gas that is recovered through lines 62 and 64. This dewatered stream is passed through line 34 into facility 12.

In the use of dewatering vessels 58 and 60, one of the vessels is used until it becomes spent and then the flow of gas is switched to the other vessel with the first vessel then being regenerated while the second vessel is in service. Typically two vessels are placed in each train to meet the requirements to dewater the incoming gas. Typically vessels 50 and 60 include an absorption material such as a molecular sieve, activated alumina and the like. This material is effective to remove water from a gaseous stream to extremely low levels and to render the gaseous stream suitable for liquefaction in facility 12. Such molecular sieves are typically regenerated by passing a heated gas through the vessel to remove water.

The desulfurization vessels are readily regenerated as well known to those skilled in the art by a variety of techniques. One commonly used technique is the use of a reboiler (not shown) on vessel 46 for the regeneration.

Clearly the construction of separate trains of refrigeration processes as discussed above results in the expenditure of considerable capital to duplicate facilities in each turn such as the dewatering and acid gas removal vessels and regeneration vessels. Accordingly a continuing search has been directed to the development of systems and methods for reducing the unnecessary expense for these duplicate vessels.

SUMMARY OF THE INVENTION

According to the present invention, it has now been found that the expense required for these vessels can be reduced by a method for designing an efficient and economical light hydrocarbon gas liquefaction process for the liquefaction of selected quantities of light hydrocarbon gas in a first light hydrocarbon gas liquefaction train and up to a selected maximum quantity of light hydrocarbon gas using a plurality of light hydrocarbon gas liquefaction trains, the method comprising:

a) designing a first light hydrocarbon gas liquefaction process train including facilities for light hydrocarbon gas pretreatment to remove acid gases and water, refrigerant compression, access services, light hydrocarbon gas liquefaction, and liquefied light hydrocarbon gas product storage and shipping;

b) designing at least a portion of the facilities in the first train for shared use by the first train and subsequent trains;

c) designing at least a portion of the first train facilities for shared use with modular expansion, as required by the addition of subsequent trains, up to the maximum capacity required to liquefy the maximum quantity of light hydrocarbon gas or initially designing the portion of the first train facilities for shared use of a size sufficient to liquefy the maximum quantity of light hydrocarbon gas.

It has further been found that an improvement is achieved by a method for efficiently and economically constructing a light hydrocarbon gas liquefaction process for the liquefaction of selected quantities of light hydrocarbon gas in a first light hydrocarbon gas liquefaction train and up to a selected maximum quantity of liquefied light hydrocarbon gas using a plurality of light hydrocarbon gas liquefaction trains, the method comprising:

a) constructing a first light hydrocarbon gas liquefaction process train for the liquefaction of a first selected quantity light hydrocarbon gas including facilities for light hydrocarbon gas pretreatment to remove acid gases and water, refrigerant compression, access services, light hydrocarbon gas liquefaction, and liquefied light hydrocarbon gas product storage and shipping;

b) constructing at least a portion of the facilities in the first train for shared use by the first train and subsequent trains;

c) constructing at least a portion of the first train facilities for shared use with modular expansion, as required by the addition of subsequent trains, up to the maximum capacity required to liquefy the maximum quantity of light hydrocarbon gas or initially constructing the portion of the first train facilities for shared used of a size sufficient to liquefy the maximum quantity of light hydrocarbon gas;

d) constructing additional trains as required to liquefy a second selected quantity of light hydrocarbon gas;

e) providing at least a portion of the facilities in the additional trains by shared use of the shared use facilities in the first train as constructed in the first train or as constructed in the first train and expanded to the required capacity;

g) liquefying the second selected quantity of light hydrocarbon gas to produce a selected quantity of liquefied light hydrocarbon gas product.

It has been found that an improvement is achieved by a method for efficiently and economically operating a light hydrocarbon gas liquefaction process for the liquefaction of selected quantities of light hydrocarbon gas in a first light hydrocarbon gas liquefaction train and up to a selected maximum quantity of liquefied light hydrocarbon gas using a plurality of light hydrocarbon gas liquefaction trains, the method comprising:

a) constructing a first light hydrocarbon gas liquefaction process train for the liquefaction of a first selected quantity light hydrocarbon gas including facilities for light hydrocarbon gas pretreatment to remove acid gases and water, refrigerant compression, access services, light hydrocarbon gas liquefaction, and liquefied light hydrocarbon gas product storage and shipping;

b) constructing at least a portion of the facilities in the first train for shared use by the first train subsequent trains;

c) constructing at least a portion of the first train facilities for shared use for modular expansion, as required by the addition of subsequent trains, up to the maximum capacity required to liquefy the maximum quantity of light hydrocarbon gas or initially designing the portion of the first train facilities for shared use of a size sufficient to liquefy the maximum quantity of light hydrocarbon gas;

d) constructing additional trains as required to liquefy a second selected quantity of light hydrocarbon gas;

e) providing at least a portion of the facilities in the additional trains by shared use of the shared use facilities in the first train as constructed in the first train or as constructed in the first train and expanded to the required capacity;

f) processing light hydrocarbon gas for the first train and the additional trains in at least a portion of the shared facilities; and g) liquefying the second selected quantity of light hydrocarbon gas to produce a selected quantity of liquefied light hydrocarbon gas product.

It has now been found that the expense required for these vessels is reduced by a method for removing acid gases from a light hydrocarbon gas feed stream to each of a plurality of light hydrocarbon gas liquefaction trains, the method comprising: a) providing a plurality of light hydrocarbon gas acid gas removal vessels, each of the vessels being adapted to remove acid gases from a light hydrocarbon gas feed stream for a light hydrocarbon gas liquefaction train; b) passing a first light hydrocarbon gas feed stream through a first light hydrocarbon gas acid gas removal vessel to produce a first light hydrocarbon gas feed stream having a reduced acid gas content for a first light hydrocarbon gas liquefaction train; c) passing a second light hydrocarbon gas feed stream through a second light hydrocarbon gas acid gas removal vessel to produce a second light hydrocarbon gas feed stream having a reduced acid gas content for a second light hydrocarbon gas liquefaction train; and, d) regenerating the first spent light hydrocarbon gas acid gas removal vessels for re-use to remove acid gas from light hydrocarbon gas streams.

It has further been found that the expense for equipment for dewatering the gas stream is reduced by a method for removing water from a light hydrocarbon gas feedstream to each of a plurality of light hydrocarbon gas liquefaction trains, the method comprising: a) providing a plurality of light hydrocarbon gas dewatering molecular sieve vessels, each of the vessels being adapted to dewater a light hydrocarbon gas feed stream to a light hydrocarbon gas liquefaction train; b) passing a first light hydrocarbon gas feed stream through a first light hydrocarbon gas molecular sieve vessel to produce a first dewatered light hydrocarbon gas feed stream for a first light hydrocarbon gas liquefaction train; c) passing a second light hydrocarbon gas feed stream through a second light hydrocarbon gas dewatering molecular sieve vessel to produce a second dewatered light hydrocarbon gas feed stream for a second light hydrocarbon gas liquefaction train; d) switching the first light hydrocarbon gas stream from the first light hydrocarbon gas dewatering molecular sieve vessel when the first light hydrocarbon gas dewatering vessel is spent and passing the first light hydrocarbon gas stream through another of the plurality of light hydrocarbon gas dewatering vessels to produce the first dewatered light hydrocarbon gas feed stream for the first light hydrocarbon gas liquefaction train; and, e) regenerating the first spent light hydrocarbon gas dewatering molecular sieve vessel for re-use to dewater a light hydrocarbon gas stream.

It has further been found that the expense for removing acid gases and dewatering a light hydrocarbon gas feed stream is substantially reduced by a method for removing acid gases and dewatering a light hydrocarbon gas feed stream to each of a plurality of light hydrocarbon gas liquefaction trains, the method comprising: a) providing a plurality of light hydrocarbon gas acid gas removal vessels, each of the vessels being adapted to remove acid gases from a light hydrocarbon gas feed stream to a light hydrocarbon gas liquefaction train; b) passing a first light hydrocarbon gas feed stream through a first light hydrocarbon gas acid gas removal vessel to produce a first light hydrocarbon gas feed stream having a reduced acid gas content for a first light hydrocarbon gas liquefaction train; c) passing a second light hydrocarbon gas feed stream through a second light hydrocarbon gas acid gas removal vessel to produce a second light hydrocarbon gas feed stream having a reduced acid gas content for a second light hydrocarbon gas liquefaction train; d) regenerating the first spent light hydrocarbon gas acid gas removal vessels for re-use to remove acid gas from light hydrocarbon gas streams; e) providing a plurality of light hydrocarbon gas dewatering molecular sieve vessels, each of the vessels being adapted to dewater a light hydrocarbon gas feed stream to a light hydrocarbon gas liquefaction train; f) passing a first light hydrocarbon gas feed stream through a first light hydrocarbon gas dewatering vessel to produce a first dewatered light hydrocarbon gas feed stream for a first light hydrocarbon gas liquefaction train; g) passing a second light hydrocarbon gas feed stream through a second light hydrocarbon gas dewatering molecular sieve vessel to produce a second dewatered light hydrocarbon gas feed stream for a second light hydrocarbon gas liquefaction train; h) switching the first light hydrocarbon gas stream from the first light hydrocarbon gas dewatering molecular sieve vessel when the first light hydrocarbon gas dewatering vessel is spent and passing the first light hydrocarbon gas stream through another of the plurality of light hydrocarbon gas dewatering vessels to produce the first dewatered light hydrocarbon gas feed stream for the first light hydrocarbon liquefaction train; and, i) regenerating the first spent light hydrocarbon gas dewatering molecular sieve vessel for re-use dewater a light hydrocarbon gas stream.

The invention further comprises a system for removing acid gases from a light hydrocarbon gas feed stream to each of a plurality of light hydrocarbon gas liquefaction trains, the system comprising:

a) a plurality of aqueous amine acid gas removal vessels, each of the vessels having a gas inlet and a gas outlet so that an inlet gas can be charged to each acid gas removal vessel and a gas having a reduced acid content recovered from each acid gas removal vessel;

b) a gas supply line in fluid communication with each gas inlet;

c) a treated gas recovery line in fluid communication with each gas outlet;

d) a regenerated aqueous amine inlet to each acid gas removal vessel;

e) a spent aqueous amine outlet from each acid gas removal vessel; and, f) a spent aqueous amine regenerator in fluid communication with at least one selected regenerated aqueous amine inlet and with at least one selected spent aqueous amine outlet.

The invention also comprises a system for dewatering a light hydrocarbon gas feed stream to each of a plurality of light hydrocarbon gas liquefaction trains, the system comprising: a) a plurality of aqueous amine molecular sieve dewatering vessels, each of the vessels having a gas inlet and a dewatered gas outlet so that an inlet gas can be charged to each dewatering vessel and a desulfurized gas recovered from each dewatering vessel; b) a gas supply line in fluid communication with each gas inlet; c) a gas recovery line in fluid communication with each dewatered gas outlet line; and, d) a regeneration outlet line in fluid communication with each dewatering vessel.

The invention further comprises a system for removing acid gases and dewatering a light hydrocarbon gas feed stream to each of a plurality of light hydrocarbon gas liquefaction trains, the system comprising:

a plurality of aqueous amine acid gas removal vessels, each of the vessels having a gas inlet and a gas outlet so that an inlet gas can be charged to each acid gas removal vessel and a gas having a reduced acid content recovered from each acid gas removal vessel;

b) a gas supply line in fluid communication with each gas inlet;

c) a reduced acid gas content gas recovery line in fluid communication with each gas outlet;

d) a regenerated aqueous amine inlet to each acid gas removal vessel;

e) a spent aqueous amine outlet from each acid gas removal vessel; and, f) a plurality of molecular sieve dewatering vessels, each of the dewatering vessels having a gas inlet and a dewatered gas outlet so that an inlet gas can be charged to each dewatering vessel and a dewatered gas recovered from each dewatering vessel;

g) a gas supply line in fluid communication with each gas inlet;

h) a dewatered gas recovery line in fluid communication with each dewatered gas outlet line and;

i) a regeneration outlet line in fluid communication with each dewatered vessel so that each dewatering vessel can be thermally regenerated.

DESCRIPTION OF PREFERRED EMBODIMENTS

In the description of the Figures, numerous pumps, valves and the like, necessary to achieve the flows shown, known to those skilled in the art have not been shown for simplicity.

Figure 1:
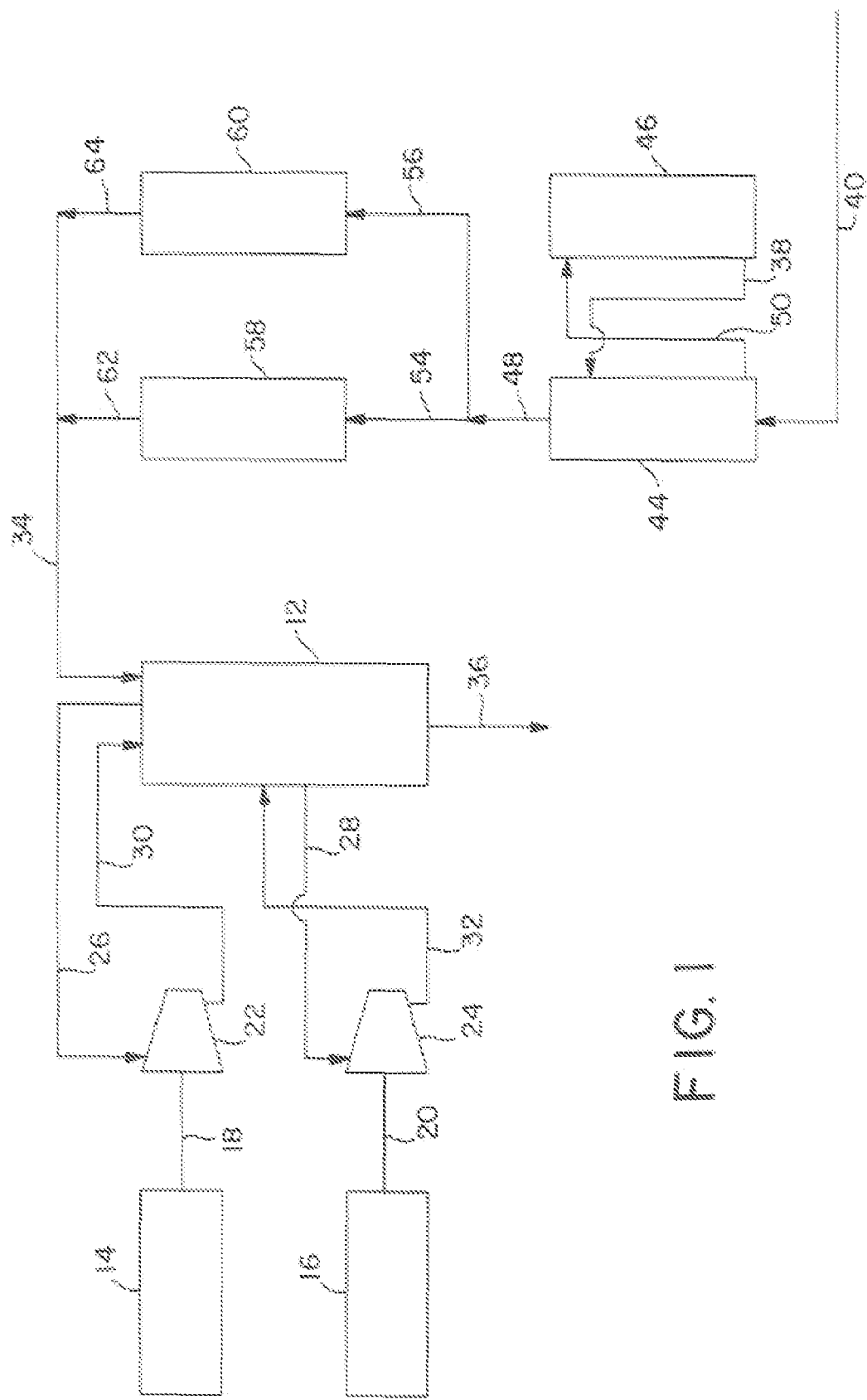
FIG. 1 is a schematic diagram of an embodiment of a light hydrocarbon gas liquefaction train.

The present invention provides an improved efficiency and economy in operating a light hydrocarbon gas liquefaction process for the liquefaction of selected quantities of light hydrocarbon gas in a first light hydrocarbon gas liquefaction train and up to a selected maximum quantity of liquefied light hydrocarbon gas using a plurality of light hydrocarbon gas liquefaction trains by a method comprising the design of such processes to include certain facilities which are common to most if not all gas liquefaction processes. As indicated the term "light hydrocarbon gas liquefaction train" or "train" refers to those units and facilities used for pretreatment and post-treatment of the gas feeds to the liquefaction facility as well as the facilities for compressing the refrigerant and the like as shown in FIG. 1. Since these requirements are common to substantially all liquefaction trains they are normally found in each liquefaction trains. Vessels for the removal of acid gases and for dewatering typically include both an absorption vessel and a regenerator vessel to regenerate the media used in the vessel for acid gas removal or for dewatering respectively. For example in the acid gas removal section and absorption vessel and a regeneration vessel are required. If these facilities are duplicated in each train then each train will include an absorption vessel and a regenerator vessel. Clearly an economy could be realized if upon design and construction of the first train the train was designed and constructed to include regenerator for the aqueous amine used in the acid gas absorption vessels of a size sufficient to accommodate additional absorption vessels as required as additional trains were added. Desirably this equipment is located in an area which is equally accessible or at least accessible to each of the trains so that additional acid gas removal vessels can be positioned to serve each train and remain in fluid communication with the regenerator vessel for the regeneration and recycling of the aqueous amine solution used for the acid gas absorption. For instance these vessels could be commonly sited with the gas from which the acid gases have been removed being then passed to the appropriate liquefaction facility. This results in the construction of only a single aqueous amine regeneration vessel and permits the construction of only an additional acid gas absorption vessel for each liquefaction train.

Similarly when dewatering vessels are used two are typically constructed for each train. One is used for absorption of water with the second being regenerated by hot gas to drive out the water during the period of use of the first vessel. When the estimated maximum quantity of gas to be produced is known then a plurality of dewatering vessels can be placed together at a common site to dewater the reduced acid gas content gas produced by the removal of the acid gases to produce a dewatered light liquid hydrocarbon gas stream having a reduced acid gas content. It is well known that the regeneration times for such vessels is substantially less than the time required on line for dewatering. Prior practice has been to provide two dewatering vessels for each train so that one vessel is on line while the other is regenerated. If the vessels are located at a common site only a single vessel can be added for the second train. The single vessel is sufficient since the two vessels which are operative at any given time will operate for long enough to provide time to regenerate the third vessel. When the third vessel is regenerated the gas flow from one of the other vessels which may have become spent can be rerouted to the regenerated vessel with the vessel which has become spent then being regenerated. By the use of the vessels in this fashion a plurality of vessels can be used without the need to produce a second vessel for regeneration for each dewatering vessel. These vessels can be used in groups wherein the number of vessels usable in a group is equal to a number equal to the run time for each vessel divided by the regeneration time to produce a number which is a whole number disregarding any fraction plus one. This number defines the number of vessels which can be used with one additional vessel for regeneration. In the event that the regeneration time is equal to one third of the run time then four vessels can be used to service three trains rather than the six vessels which would normally be constructed according to the prior art. Similarly improvements can be realized in the construction of docking facilities, liquid natural gas storage and shipping facilities, $C_3+$ hydrocarbon removal facilities and the like.

According to the present invention these facilities are produced in a form in the first train from which they can be expanded by modular increments or of a size necessary to handle the maximum quantity of light hydrocarbon gas which will be processed through the liquefaction process.

Typically, such processes are expanded by adding trains and as indicated previously by adding all the facilities required for each train in each train. According to the present invention shared facilities are used by the first liquefaction train and the subsequent liquefaction trains. The initial or first liquefaction train is designed to size the shared equipment of a size capable of handling the maximum capacity expected by the combination of liquefaction trains or in a form adapted to incremental expansion as additional trains are added. For instance in FIG. 2 it is disclosed that less than a full amount of compressed refrigerant may be charged in a second liquefaction train initially. This permits addition of the train before a market exists for all of the liquefied natural gas which could be produced through the two train system. It also permits ready expansion of this system when the market expands to include a full compressed refrigerant charge to the second train liquefaction facility.

The improvement of the present invention is readily achieved by a method for designing a process to achieve these advantages by the construction of a process to achieve these advantages and by operation of the process to realize these advantages.

Figure 2:
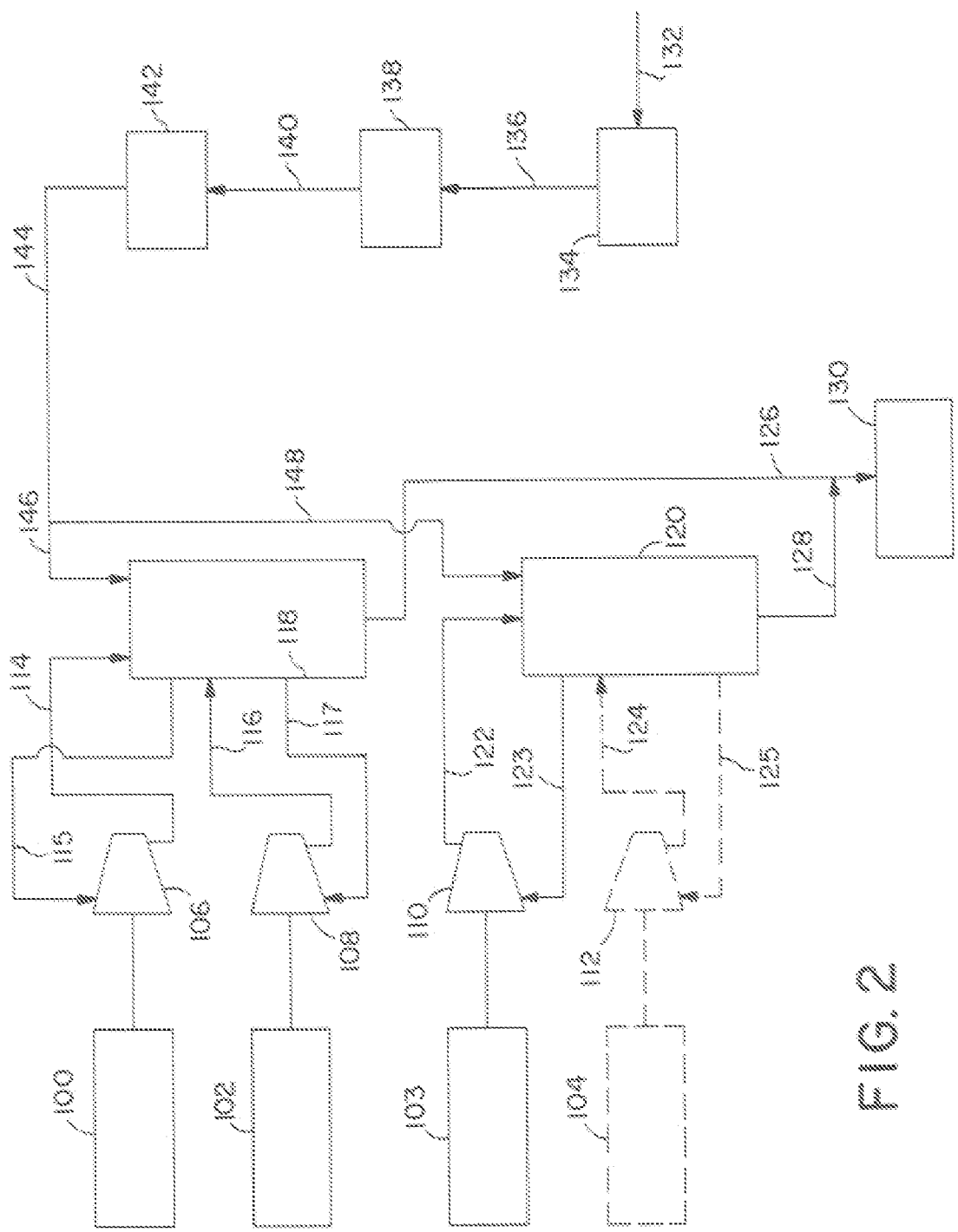
FIG. 2 is a schematic diagram of light hydrocarbon gas liquefaction process according to the process of the present invention including two trains.

For instance in FIG. 2 a two train process is shown. The first train comprises turbines 100 and 102 which are coupled to refrigerant compressors 106 and 108 with the refrigerant being passed via lines 114 and 116 to a liquefaction facility 118. A liquefied natural gas product is recovered via a line 126 from liquefaction facility 118 and passed to product storage and export facility 130. A second train is shown wherein a turbine 103 and a turbine 104 which is shown in dotted lines to indicate that this turbine is not present, but is contemplated in conjunction with the second train, are shown connected to a refrigerant compressor 110 and a refrigerant compressor 112 which is also contemplated for addition. The compressor refrigerant from compressor 110 is passed via a line 122 to a refrigerant facility 120 with the contemplated compressed refrigerant from compressor 112 being passed via a line 124 to facility 120 when compressor 112 is added. The inlet gas is supplied through a line 132 to an acid gas removal section 134 where it is treated for the removal of acid gas and passed through a line 136 to a dewatering section 138. In dewatering section 138 water is removed from the light hydrocarbon gas stream and it is passed via a line 140 to a $C_3$+ heavier hydrocarbon removal section 142. The gas after treatment in section 142 is passed through a line 144 to line 146 into facility 118 or a line 148 into a facility 120. Liquefied light hydrocarbon gas from facility 120 is recovered via a line 128.

In the operation of the process shown in FIG. 2 the inlet gas is treated for the removal of acid gas, water and hydrocarbon gases heavier than about $C_3$. In the facilities used to treat the gas, the gas inlet stream is treated for the removal of these components from the gas inlet to both facility 118 and facility 120. This is achieved by positioning the respective facilities in fluid communication with the liquefaction facilities. This arrangement permits the use of shared facilities and achieves the economies discussed above.

Various more specific applications of the use of shared acid gas removal facilities and dewatering facilities are discussed below.

FIG. 1 has been discussed above.

In FIG. 1 a regenerator vessel 46 is equipped to use at least one of a stripping gas and a reboiler or the like (heat source not shown) to regenerate spent aqueous amine solutions for use in acid gas removal vessel 44 is shown. The regeneration removes carbon dioxide, hydrogen sulfide and the like with the regenerated aqueous amine being returned via a line 38 to an upper portion of vessel 44 with spent amine being withdrawn from vessel 44 through a line 50 and passed into regenerator 46 for regeneration and return to vessel 44. The operation of such vessels, as shown, is well known to those skilled in the art.

Figure 3:
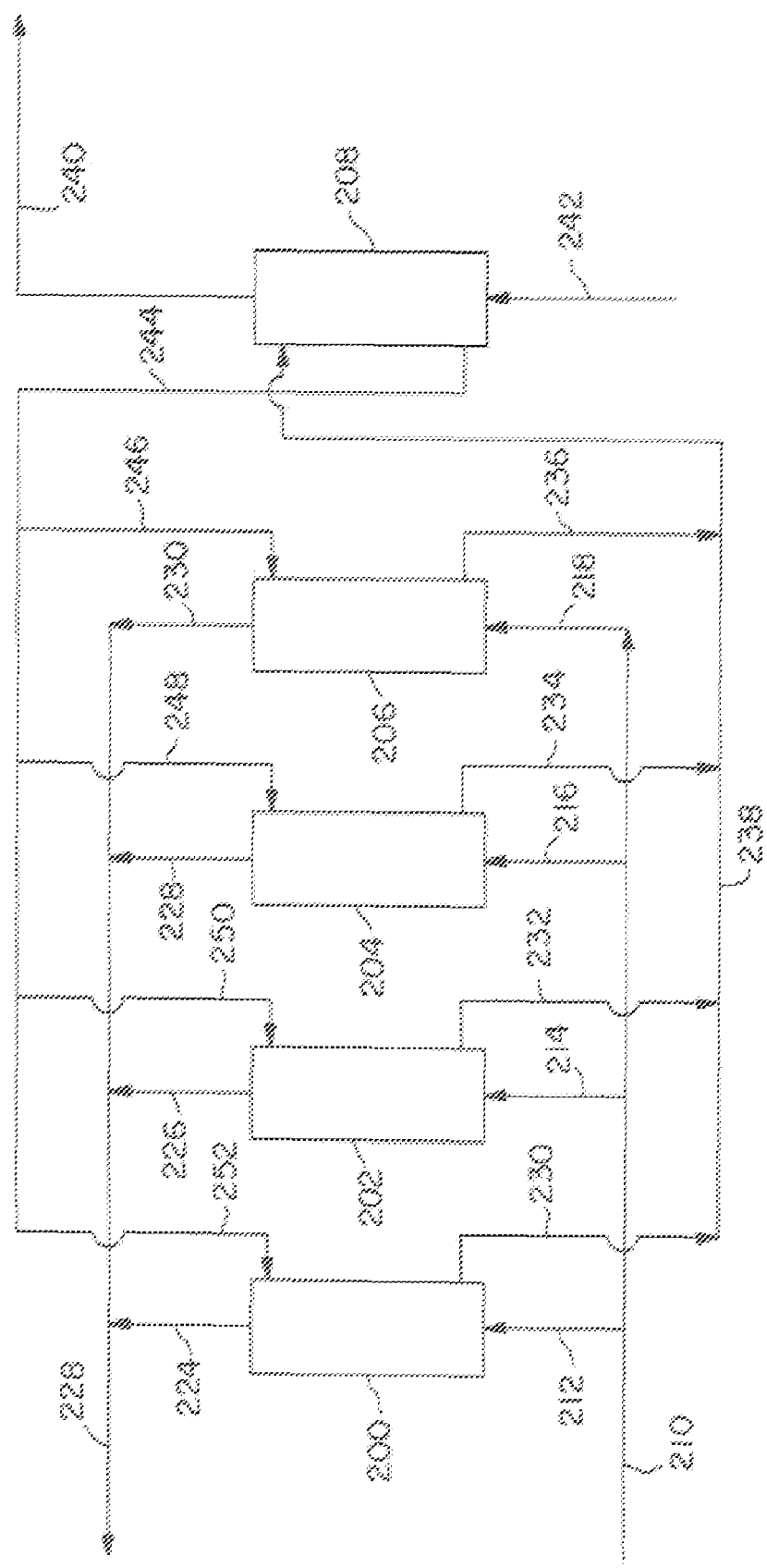
FIG. 3 is a schematic diagram of an embodiment of an acid gas removal facility according to the present invention.

According to the present invention, it is desirable that the facilities required for acid gas removal and for dewatering be arranged in a common area, or at least in common fluid communication. In FIG. 3, a system is shown wherein four acid gas removal vessels 200, 202, 204 and 206 are available for use to remove acid gases from inlet gas streams, which are charged to the process through a line 210. The inlet gas may be passed via lines 212, 214, 216 and 218, to any or all of the acid gas removal vessels 200, 202, 204 and 206. The acid gas removal vessels shown contain aqueous amine solutions and operate as discussed in connection with FIG. 1.

The gaseous streams having reduced acid gas contents are recovered through lines 224, 226, 228 and 230. The gas stream having a reduced acid is recovered through a line 244. Any or all of the acid gas removal vessels can be used with it being anticipated that one such vessel will be used for each train so that no additional regeneration vessel is required for the train. Desirably a plurality of trains are serviced by the acid gas removal facility shown in FIG. 3. One or more acid gas removal vessels may be constructed with the first train with the regeneration vessel being sized to handle enough such vessels to service the trains required to achieve the maximum design capacity for the entire liquefaction process including all trains.

As shown, the facility could attend to the acid gas removal needs for four trains with regeneration occurring in a regenerator vessel 208. The regeneration of the aqueous amine in vessel 208 may employ the use of a reboiler (not shown) to heat the aqueous amine solution with or without use of a stripping gas introduced through a line 242 to regenerate the aqueous amine solution by driving off acid gases such as carbon dioxide, hydrogen sulfide and the like for recovery through a line 240. The fresh amine is produced via a line 244 and passed through lines 246, 248, 250 and 252 into the upper portion of vessels 200, 202, 204, and 206 with spent amine being recovered through lines 230, 232, 234, and 236. The spent amine is passed via a line 238 to regenerator 208.

In the operation of the process, a regenerated aqueous amine solution is provided to the upper portion of each vessel on a continuous basis with a spent amine solution being recovered from the lower portion of the vessel and passed back to regeneration. Vessel 208, however, must be sized to provide sufficient fresh regenerated aqueous amine to remove the acid gas compounds from the gaseous stream charged to the selected ones of vessels 200, 202, 204 and 206. In the operation of the process, for instance if two refrigeration trains are in operation and using vessels 200 and 202 then vessels 204 and 206 would be idle and available for use by additional trains. In the event that a third train is added, vessel 204 could be placed in use for the third train with capacity for a fourth train being available in vessel 206. The sizing of vessel 208 entails little additional expense to provide sufficient regenerating capacity to provide sufficient regenerated amine to service all four of vessels.

Thus, additional trains can be added without additional expense or by simply adding an additional acid gas removal vessel. So long as sufficient regeneration capacity exists in regenerator 208, the addition of additional trains is at a considerably reduced capital cost by virtue of requiring only the additional of a single acid gas removal vessel rather than an acid gas removal vessel and a regeneration vessel.

Figure 4:
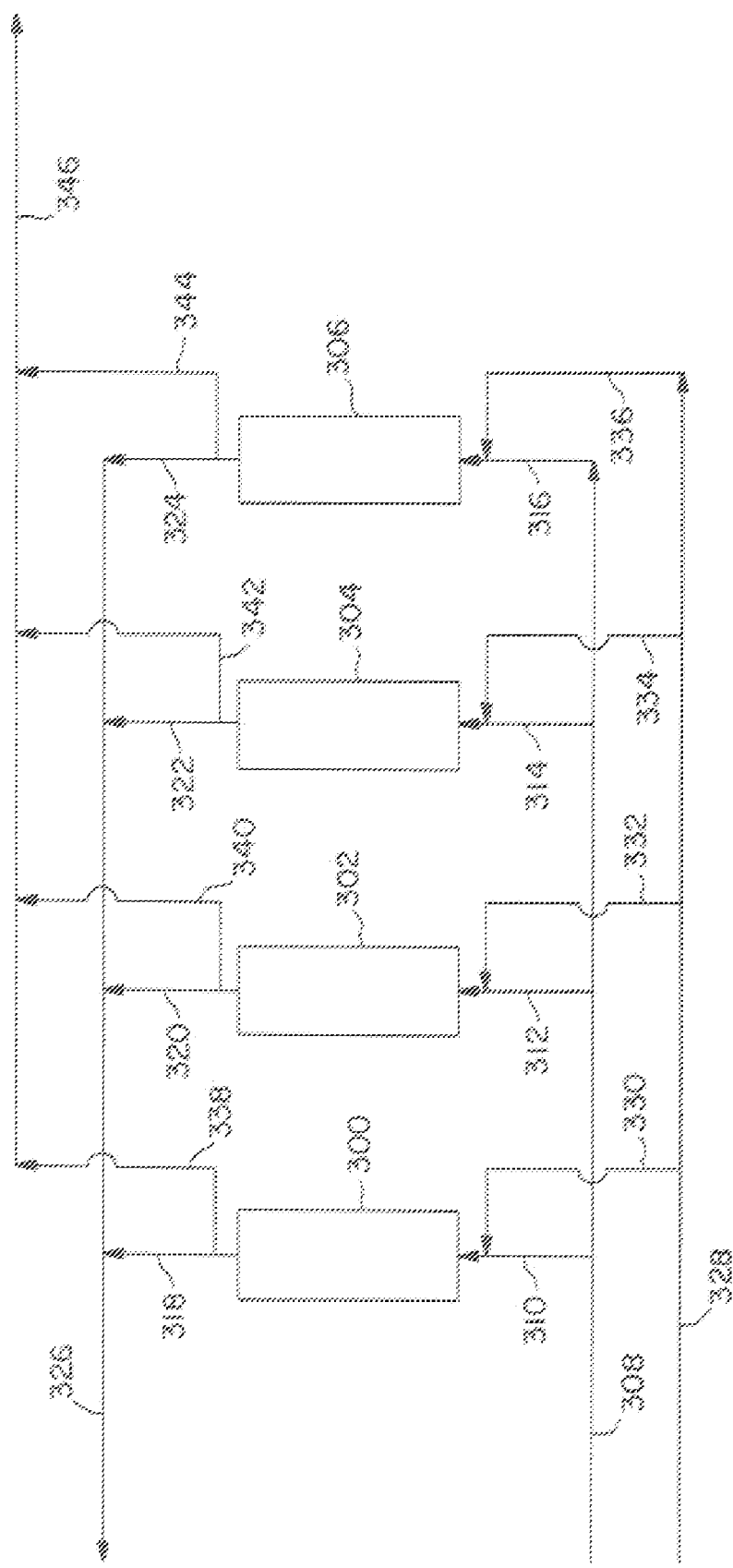
FIG. 4 is a schematic diagram of a facility for dewatering according to the present invention.

In a preferred embodiment shown in FIG. 4, an arrangement of vessels suitable for use for dewatering a light hydrocarbon gas stream has been shown. An inlet gas stream is received through a line 308 and may be passed to selected one of vessels 300, 302, 304 and 306. The inlet gas passes to the vessels through lines 310, 312, 314 and 316 respectively. The gas is treated in vessels 300, 302, 304 and 306 to remove water from the gaseous stream. The product streams are recovered through lines 318, 320, 322 and 324 respectively. The product gases are recovered through a line 326. For purposes of regeneration, a stripping gas may be introduced through a line 328 to each vessel through lines 330, 332, 334 and 336 respectively.

Typically the regeneration is by heat and the heat may be supplied for the regeneration by a hot gas flow through the dewatering vessels. In either event, whether the stripping gas is or is not used, discharged gases will be released through lines 338, 340, 342 and 344. These gases are recovered through a line 346 and passed to recovery or other processing as desired.

In the embodiment, shown in FIG. 4 the number of vessels shown is appropriate for a process wherein the run time of each vessel in dewatering service is equal to three times the time required for regeneration. Accordingly, with four vessels, three trains can be serviced with the regeneration of each vessel occurring while the other three are in use. For instance, if the vessels are started at a sequence which will result in them becoming spent at intervals of one-third of their lives, then when vessel 300 is spent the gas flow directed to vessel 300 can be switched to vessel 306 with vessels 302 and 304 remaining in service. Vessel 300 is regenerated and when vessel 302 is spent the gas flow previously directed to vessel 302 is switched to vessel 300 and regeneration of vessel 302 begins. When vessel 304 is spent then vessel 302 will have been regenerated and production can be switched to vessel 302 and the like. Four dewatering vessels can be thus used to service three refrigeration trains. The maximum number of vessels used in such an arrangement is equal to the lowest whole number defined by division of the run time for each vessel by the regeneration time, plus one. This relationship can be expressed as:

$$\text{maximum number} = \frac{\text{run time}}{\text{regeneration time}} \text{(whole number without regard to any fraction)} + 1$$

Clearly operation as shown in FIG. 4 has resulted in the elimination of two vessels from the total required vessels for the of the inlet gas stream as previously practiced. Previously the dewatering vessels were provided for each train in pairs. Accordingly the four vessel operation above has reduced the number of required dewatering vessels from six to four.

According to the present invention, an improved system and method for producing desulfurized, dewatering gas for refrigeration processes comprising a plurality of refrigeration trains has been shown. It will be readily appreciated by those skilled in the art, upon review of FIG. 4 particularly, that when more trains are present then can be accommodated with the arrangement shown in FIG. 4 based upon the regeneration times and the run times, then clearly a second system of the same type can be installed with a similar improvement for future trains beyond the number defined above.

By the present invention, three trains can be serviced with the same number of vessels with are normally used for two trains. This is clear saving of both capital and operating expense for two additional vessels while accomplishing the same results by the apparatus shown in FIG. 4. Clearly different numbers of vessels can be used depending upon the different run times and regeneration times for the particular system.

According to the present invention improved efficiency and economy have been achieved by including in a first train of a light hydrocarbon gas liquefaction process shared facilities which can be used by second and subsequent liquefaction trains by either modularization or by use of the facilities which are designed for the desired maximum number of liquefaction trains initially. This results in substantial savings in the overall operation of the process at maximum capacity and provides for great ease in expanding the process incrementally. For instance in the treatment of the light hydrocarbon gas streams improved economy can be achieved as discussed by adding a regeneration section which is of a size suitable to regenerate aqueous amine for all of the acid gas removal vessels which are contemplated at maximum capacity of the present comprising all of the trains in combination. While this capacity may not be achieved for many years the added cost of the larger vessel is relatively minor compared to the savings by comparison to the use of a second regeneration vessel and a second acid gas removal vessel for train. Similarly the use of the dewatering vessels as discussed above has resulted in substantial savings. For instance even when only two vessels are used initially the addition of a third vessel for operation in this fashion permits the addition of a second train but with the addition of only a single dewatering vessel rather than the pair of dewatering vessels usually required. Further as noted in FIG. 2 in the event that less than a full liquefaction facility is required for the desired increase in capacity the added liquefaction facility can be added with a reduced light hydrocarbon gas flow with a reduced quantity of compressed refrigerant to produce a liquefied light hydrocarbon gas stream in a quantity suitable to meet the current demand. Similarly docking facilities, access roads, $C_3+$ hydrocarbon removal facilities and the like can all be designed for either modular expansion or of a size to accommodate the maximum plant size initially with the resulting efficiency in process expansion when required and economies achieved by reducing the duplication of equipment.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A system for dewatering a light hydrocarbon gas feed stream to each of a plurality of light hydrocarbon gas liquefaction trains, the system comprising:
    a) a plurality of molecular sieve dewatering vessels, each of the vessels having a gas inlet and a gas outlet so that an inlet gas can be charged to each dewatering vessel and a dewatered gas recovered from each dewatering vessel;
    b) a light hydrocarbon gas supply line in fluid communication with each gas inlet;
    c) a dewatered light hydrocarbon gas recovery line in fluid communication with each gas outlet line; and,
    d) a regeneration gas outlet line in fluid communication with each dewatering vessel so that each dewatering vessel can be thermally regenerated.

2. The system of claim 1 wherein the number of dewatering vessels is less than or equal to an average run time for each of the dewatering vessels in dewatering service divided by the average regeneration time for each of the dewatering vessels plus one or whole number multiples thereof.

3. A system for removing acid gases and dewatering a light hydrocarbon gas feed stream to each of a plurality of light hydrocarbon gas liquefaction trains, the system comprising:
    a) a plurality of aqueous amine acid gas removal vessels, each of the vessels having a gas inlet and a reduced acid gas outlet so that an inlet gas can be charged to each acid gas removal vessel and a gas having a reduced acid gas content can be recovered from each acid gas removal vessel;
    b) a gas supply line in fluid communication with each gas inlet;
    c) a gas recovery line in fluid communication with each reduced acid gas outlet;
    d) an aqueous amine regenerator having a spent amine inlet and a regenerated aqueous amine outlet;
    e) a regenerated aqueous amine inlet in fluid communication with the regenerated aqueous amine outlet and each acid gas removal vessel;
    f) a spent aqueous amine outlet in fluid communication with the spent aqueous amine inlet and each acid gas removal vessel; and
    g) a plurality of molecular sieve dewatering vessels, each of the dewatering vessels having a reduced acid gas inlet and a gas outlet so that a reduced acid gas inlet gas from an acid gas removal vessel can be charged to each dewatering vessel and a dewatered gas recovered from each dewatering vessel;
    h) a gas supply line in fluid communication with at least one reduced acid gas outlet;
    i) a dewatered gas recovery line in fluid communication with each dewatered gas outlet line and;
    j) a regeneration outlet line in fluid communication with each dewatered vessel so that each dewatering vessel can be thermally regenerated.

4. A system for removing acid gases from a light hydrocarbon gas feed stream to each of a plurality of light hydrocarbon gas liquefaction trains, the system comprising:

a) a plurality of aqueous amine acid gas removal vessels, each of the vessels having a gas inlet and a reduced acid gas outlet so that an inlet gas can be charged to each acid gas removal vessel and a gas having a reduced acid content can be recovered from each acid gas removal vessel;

b) a gas supply line in fluid communication with each gas inlet;

c) a treated gas recovery line in fluid communication with each gas outlet;

d) a regenerated aqueous amine inlet to each acid gas removal vessel;

e) a spent aqueous amine outlet from each acid gas removal vessel; and, f) a spent aqueous amine regenerator in fluid communication with at least one selected regenerated aqueous amine inlet and with at least one selected spent aqueous amine outlet.

* * * * *